(12) United States Patent
Vithaldas et al.

(10) Patent No.: US 12,675,300 B2
(45) Date of Patent: Jul. 7, 2026

(54) SCHEMA DRIVEN USER INTERFACE CREATION TO DEVELOP AUTONOMOUS DRIVING APPLICATIONS

(71) Applicant: Toyota Research Institute, Inc., Los Altos, CA (US)

(72) Inventors: Sachit Vithaldas, Mountain View, CA (US); Daniel Stonier, Lexington, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 219 days.

(21) Appl. No.: 17/733,274

(22) Filed: Apr. 29, 2022

(65) Prior Publication Data

US 2023/0350699 A1 Nov. 2, 2023

(51) Int. Cl.
*G06F 9/451* (2018.01)
*G06F 3/04847* (2022.01)

(52) U.S. Cl.
CPC .......... *G06F 9/451* (2018.02); *G06F 3/04847* (2013.01)

(58) Field of Classification Search
CPC .............................. G06F 9/451; G06F 3/04847
See application file for complete search history.

(56) References Cited

U.S. PATENT DOCUMENTS

2007/0271079 A1* 11/2007 Oguchi .............. H04B 17/3912
703/8
2019/0107839 A1* 4/2019 Parashar .............. G05D 1/0219

2020/0086863 A1* 3/2020 Rosman ................ B60W 30/09
2020/0167436 A1* 5/2020 Xiao ........................ G06F 30/20
2021/0347372 A1* 11/2021 Bagschik ................ G06F 17/18
(Continued)

FOREIGN PATENT DOCUMENTS

WO WO-2021244956 A1 * 12/2021

OTHER PUBLICATIONS

Davis, "Design, Implementation and Testing of a Common Data Model Supporting Autonomous Vehicle Compatibility and Interoperability", Dissertation for Naval Postgraduate School, Monterey, CA, Sep. 2006 (359 pages).
(Continued)

*Primary Examiner* — Daniel W Parcher
(74) *Attorney, Agent, or Firm* — Christopher G. Darrow; Darrow Mustafa PC

(57) ABSTRACT

Arrangements described herein can facilitate the development of autonomous driving applications by enabling a user to modify existing parameters and/or define new parameters in scenario files and/or to create driving evaluation tools. A first user interface based on a schema can be generated. A first input, such as a new parameter or a modification to an existing parameter defined by a schema, can be provided on the first user interface. A second user interface can be generated using the first input provided on the first user interface. The second user interface can include the new parameter or the modification to the existing parameter. A second input relating to the new parameter or the modification to the existing parameter can be received on the second user interface. Valid data can be generated based on the second input and that conforms with the schema.

22 Claims, 7 Drawing Sheets

(56)                  References Cited

U.S. PATENT DOCUMENTS

2022/0334809 A1* 10/2022 Stone ................... G06F 16/958

OTHER PUBLICATIONS

Brutzman, "Autonomous Unmanned Vehicle Workbench (AUVW) Rehearsal and Replay: Mapping Diverse Vehicle Telemetry Outputs to Common XML Data Archives", Jan. 2007 (14 pages).
Erdogan et al., "Parametrized End-to-End Scenario Generation Architecture for Autonomous Vehicles", 6th International Conference on Control Engineering & Information Technology (CEIT), Oct. 25-27, 2018, Istanbul, Turkey (6 pages).
Zhou et al., "Towards an Integrated Modeling and Simulation Framework for Freight Transportation in Metropolitan Areas", IEEE IRI, Jul. 13-15, 2008, Las Vegas, NV (6 pages).
Hurtienne et al., "Design for Intuitive Use—Testing Image Schema Theory for User Interface Design", International Conference on Engineering Design, Aug. 28-31, 2007, Paris, France (12 pages).
Nager et al., "Scenario based virtual validation framework for autonomous driving functions," AVL List GmbH, Nov. 12, 2018 (13 pages).

\* cited by examiner

100

<u>500</u>

| Definitions: | Valid: |
|---|---|
| | |
| LatLong: | Agents: |
| | -     Type: Car |
|     Lat: decimal |     Name: Car1 |
| |     Pose: |
|     Long: decimal |       Lat: 70.30 |
| |       Long: 30.75 |
| Agent: |     Behaviors: |
| |       - FollowLane: |
|     Type: OneOf[Car, Bicycle, Motorcycle,...] |         MaxSpeedMPH: 10 |
| | -     Type: Motorcycle |
|     Starting Pose: OneOf[LatLong, LocalCoord,...] |     Name: Motorcycle 1 |
| |     Starting Pose: |
|     Behaviors: List[FollowLane, KeepDistance,...] |       Lat: 70.55 |
| Data: |       Long: 31.2 |
| |     Behaviors: |
| Agents: List[Agent] |       - KeepDistance: |
| |         To: Car1 |
| |         DistanceMeters: 10 |

Figure 6:
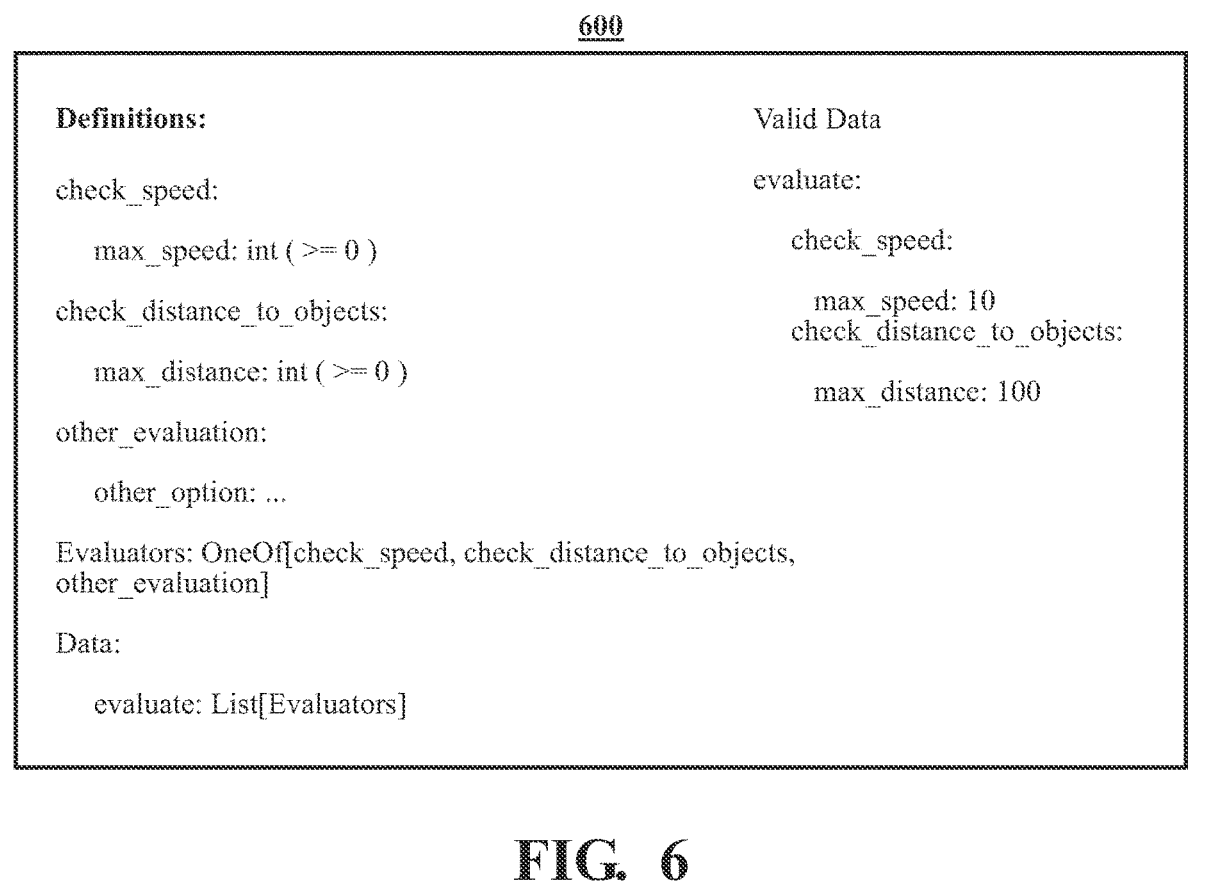

Definitions:

check_speed:

max_speed: int ( >= 0 )

check_distance_to_objects:

max_distance: int ( >= 0 )

other_evaluation:

other_option: ...

Evaluators: OneOf[check_speed, check_distance_to_objects, other_evaluation]

Data:

evaluate: List[Evaluators]

Valid Data evaluate:

check_speed:

max_speed: 10
    check_distance_to_objects:

max_distance: 100

Generate a First User Interface Based on a Schema
710

Receive a First Input on the First User Interface
720

Generate a Second User Interface Based on First User Input
730

Receive a Second User Input on the Second User Interface
740

Generate Valid Data
750

SCHEMA DRIVEN USER INTERFACE CREATION TO DEVELOP AUTONOMOUS DRIVING APPLICATIONS

FIELD

The subject matter described herein relates in general to autonomous driving applications and, more particularly, to creating user interfaces for developing autonomous driving applications.

BACKGROUND

Advanced driving-assistance systems (ADAS) are technologies that can assist a driver at various points in the operation of a vehicle. ADAS can be designed, developed, and/or studied using simulation or by studying real-world driving data. There are several participants involved in the creation of a simulation. For instance, there can be developers who develop the simulation engine. In addition, there can be front end engineers who develop ways for users to communicate with the simulator. Still further, there are researchers, who can research and develop models of how different agents in a simulation behave.

SUMMARY

In one respect, the present disclosure is directed to a system. The system can include one or more processors. The one or more processors can be programmed to initiate executable operations. The executable operations can include generating a first user interface based on a schema. The executable operations can include receiving a first input on the first user interface. The first input can be a new parameter defined by a schema and/or a modification to an existing parameter defined by a schema. The executable operations can include generating a second user interface using the first input. The second user interface can include the new parameter and/or the modification to the existing parameter. The executable operations can include receiving a second input on the second user interface. The second input can relate to the new parameter and/or the modification to the existing parameter. The executable operations can include generating valid data based on the second input. The valid data can conform with the schema defined in the first input.

In another respect, the present disclosure is directed to a method. The method can include generating a first user interface based on a schema. The method can include receiving a first input on the first user interface. The first input can be a new parameter defined by a schema and/or a modification to an existing parameter defined by a schema. The method can include generating a second user interface using the first input provided on the first user interface. The second user interface can include the new parameter and/or the modification to the existing parameter. The method can include receiving a second input on the second user interface. The second input can relate to the new parameter or the modification to the existing parameter. The method can include generating valid data based on the second input. The valid data can conform with the schema defined in the first input.

BRIEF DESCRIPTION OF THE DRAWINGS

FIG. 5 is an example of a user interface based on a schema, allowing a user to define a new parameter and/or to modify an existing parameter for a scenario file.

FIG. 6 is an example of a user interface based on a schema, allowing a user to define a new evaluation tool for use in connection with a driving log.

DETAILED DESCRIPTION

Figure 1:
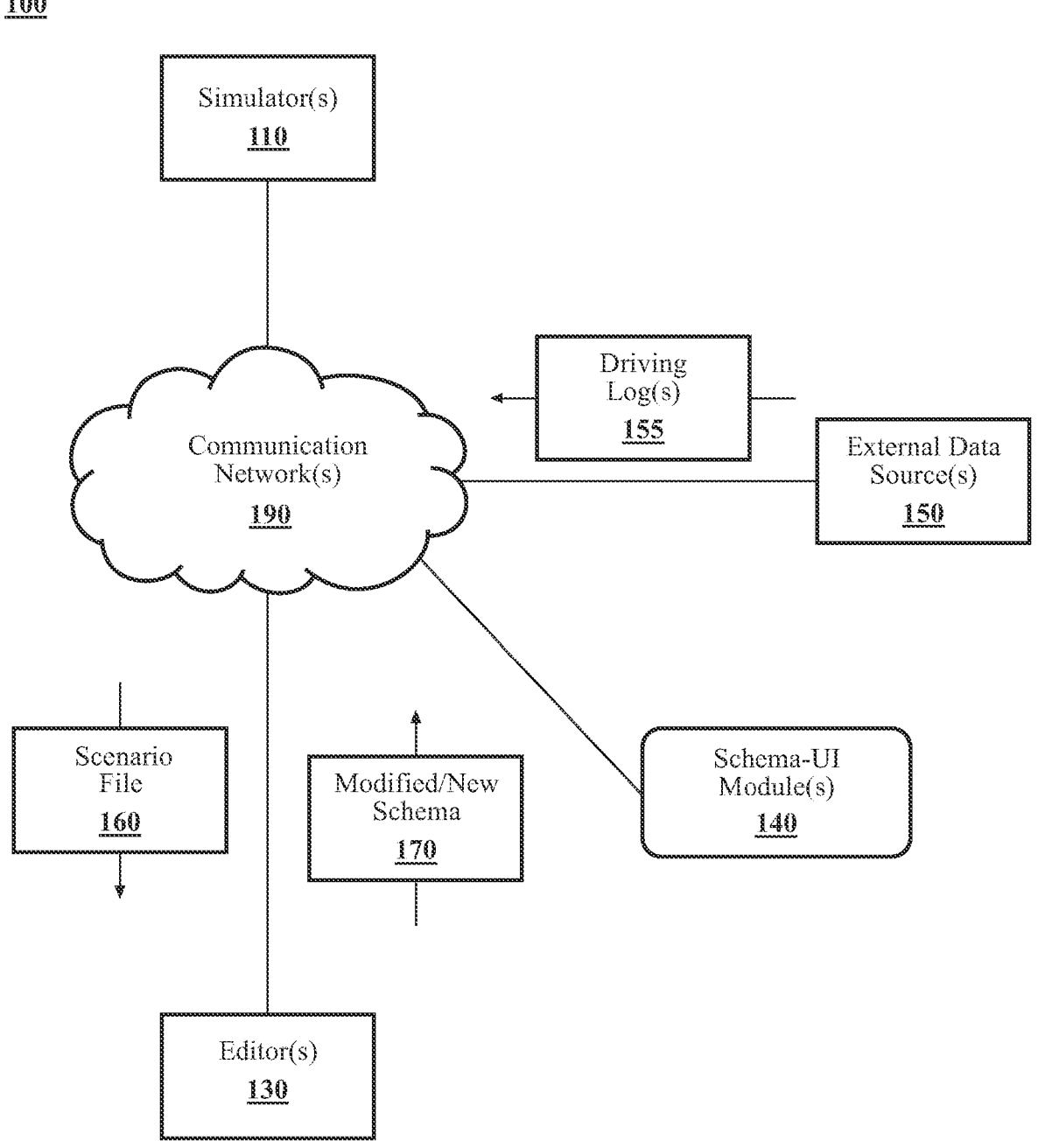
FIG. 1 is an example of a system.

In the development of a simulation, there may be times when a researcher would like to modify the front-end interface to include additional behaviors, objects, evaluation tools, or other parameters. Typically, the researcher would have to write complex code to do so, or the researcher would have to request a front-end engineer to incorporate such features into the interface. The researcher would have to wait until an updated version of the user interface to be released.

Arrangements described herein can facilitate the development and modification of tooling for autonomous driving applications by enabling a researcher or other user to modify existing parameters and/or define new parameters in scenario files locally and/or to create driving evaluation tools. Arrangements described herein can do so by presenting a user interface based on a schema. Using the schema-based interface, the user can provide an input corresponding to a new parameter defined by a schema or a modification (e.g., delete or change) to an existing parameter already defined by a schema. In some instances, the parameter can be related to a driving scenario for a simulation. In other instances, the parameter can be related to an evaluation tool for use in connection with a simulation and/or with real-world data (e.g., driving logs). Arrangements described herein can generate tools directly from the schema for the user, allowing the user to test the new and/or modified parameters within an editor. Arrangements described herein can allow a user to preview the new and/or modified parameters and/or evaluation tools without having to wait for them to be incorporated into an editor.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a system 100 is shown. Some of the possible elements of the system 100 are shown in FIG. 1 and will now be described. It will be understood that it is not necessary for the system 100 to have all of the elements shown in FIG. 1 or described herein. The system 100 can include one or more simulators 110, one or more editors 130, and/or one or more schema-user interface modules 140, and/or one or more external data sources 150.

The various elements of the system 100 can be communicatively linked to each other (or any combination thereof) through one or more communication networks 190. As used herein, the term "communicatively linked" can include direct or indirect connections through a communication channel or pathway or another component or system. A "communication network" means one or more components designed to transmit and/or receive information from one source to another. The data store(s) and/or one or more of the elements of the system 100 can include and/or execute suitable communication software, which enables the various elements to communicate with each other through the communication network and perform the functions disclosed herein.

The one or more communication networks 190 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The one or more communication networks 190 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network(s) 190 can include wired communication links and/or wireless communication links. The communication network(s) 190 can include any combination of the above networks and/or other types of networks.

The system 100 can include one or more simulators 110. The simulator(s) 110 can be any simulator, now known or later developed. The simulator(s) 110 can be configured specifically for vehicle-related simulations. The simulator(s) 110 can be a combination of software and hardware configured to create a simulated driving scenario environment and/or to generate a recreation of a driving scenario based on data from an external data source 150 (e.g., from driving logs 155 or field logs). The simulator(s) 110 can be run locally or in the cloud.

The system 100 can include one or more editors 130. The editor(s) 130 can be configured to provide a visual framework to allow a user to create scenarios and/or evaluation tools. The editor(s) 130 can be configured to enable a user to create new parameters for scenarios, modify existing parameters for scenarios, and/or new evaluation tools using schema.

The editor(s) 130 can be configured to receive a scenario file 160 and/or real-world driving data (e.g., driving log(s) 155). The scenario file 160 can be a local copy of a scenario file. The editor(s) 130 can be configured to enable a user to create a driving scenario using the scenario file 160 or from scratch. The editor(s) 130 can be configured to access the simulator(s) 110 to run a simulation using the scenario file 160. The editor(s) 130 can be configured to enable a user to modify existing parameters or create new parameters, such as new agent behaviors, in the scenario file 160, as will be described in connection with the schema-UI module(s) 140. The editor(s) 130 can be configured to enable a user to create new evaluation tools in the scenario file 160 and/or in data from an external source (e.g., the external data source(s) 150). The evaluation tools can be used to evaluate the performance of a vehicle.

The editor(s) 130 can generate a file (e.g., a scenario file or an evaluation file) with valid data. The data is valid in that it agrees with the schema and/or other inputs provided by the user. The editor(s) 130 can output scenario files to the simulator(s) 110. The editor(s) 130 can be used to create scenarios. The scenarios can be static in that they have all agents and/or object placed along with associated behaviors, trajectories, orientations, position, triggers, actions, etc. The static scenarios can be configured to always be compliant with what is defined in schema underlying the scenarios.

In some arrangements, the editor(s) 130 may not have simulation capabilities. The editor(s) 130 can be configured to send or upload updated and/or new schema 170 and/or scenario files to the simulator(s) 110. The editor(s) 130 can be configured to cause the simulator(s) 110 to run the simulation when changes made to the scenario file 160 and/or to schema underlying the scenario file 160. The editor(s) 130 can be run locally or hosted.

The editor(s) 130 can be run locally with an existing schema. Changes to the schema, including additions and/or modifications, can be saved locally. If a new agent behavior or other parameter is developed locally, it can be tested locally. For new or modified schema that are not recognized by the simulator(s) 110, the user can create an algorithm to enable the simulator(s) 110 to process the new schema and/or the modified schema. Eventually, if the new agent behavior or other parameter is satisfactory, the new agent behavior or new parameter can be integrated into the simulator(s) 110 and/or editor(s) 130 for all users.

The system 100 can include one or more modules, at least some of which will be described herein. The modules can be implemented as computer readable program code that, when executed by a processor, implement one or more of the various processes described herein. One or more of the modules can be a component of the processor(s), or one or more of the modules can be executed on and/or distributed among other processing systems to which the processor(s) is operatively connected. One or more of the modules can be stored on one or more data stores. The modules can include instructions (e.g., program logic) executable by one or more processor(s). Alternatively or in addition, the data store(s) may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein or portions thereof can be combined into a single module.

The system 100 can include one or more schema-user interface (UI) modules 140. The schema-UI module(s) 140 can be configured to generate a user interface based on a schema. The schema-based user interface can be presented to a user, such as a user of the editor(s) 130 (e.g., a researcher). The schema-based user interface can be used to generate simulation driving scenarios and/or develop evaluators for evaluating driving logs or field logs. Schema can be used to define variables such as trajectories for agents, positions of the agent in multiple frames (geodetic coordinates, utm coordinates, local coordinates etc.), the behaviors agents use, etc.

The schema can be used to define one or more aspects of one or more agents in a scenario. The schema can be used to define one or more variables for advanced driver-assistance systems (ADAS) applications. For instance, the schema can be used to define one or more variables for any of the following components: ego vehicle, other objects (vehicles, signs, etc.), 3D/2D maps, planning routes, road geometries or road representations (separate from road assets), custom zones, paths for agents to take, configuration of agents, and/or numerous parameters to configure the components.

Schema can be utilized to check data to determine if the data agrees with the schema. Schema can also be utilized to drive the development of a tool that always generates valid data. Essentially, the tool can be designed to output a file with data that always agrees with the schema.

The schema-UI module(s) 140 can receive an input provided by a user on the schema-based user interface. The input can be in the form of a schema. The schema-UI module(s) 140 can cause one or more user interfaces in the editor(s) 130 to be updated based on the input. The schema-UI module(s) 140 can send new schema to the simulator(s) 110.

In some instances, the system 100 can include one or more external data sources 150. The external data sources 150 can be any source of real-world driving data. "Real-world driving data" includes and data or information about an environment in which a vehicle operates. "Real-world driving data" includes data or information about the environment itself. "Real-world driving data" includes data or information about vehicles in the environment and/or other objects in the environment.

In one or more arrangements, the one or more external data sources 150 can include driving logs 155 from one or more vehicles. "Driving log" includes any data or information captured by one or more vehicle sensors about the external environment of the vehicle. A driving log can also include information about the vehicle itself. In some instances, the driving log can include external meta-data about the driving scene (e.g., maps, weather reports, user-provided meta-data, etc.).

The external data source(s) 150 can include any devices, components and/or systems configured to store, acquire, collect, and/or sense real-world driving data. In some arrangements, the external data source(s) 150 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the external data source(s) 150 include a plurality of sensors, the sensors can work independently from each other. Alternatively, two or more of the sensors can work in combination with each other. In such case, the two or more sensors can form a sensor network.

The external data source(s) 150 can include any suitable type of sensor, now known or later developed. For example, the external data source(s) 150 can include one or more cameras, one or more radar sensors, one or more LIDAR sensors, one or more sonar sensors, and/or one or more ranging sensors. The sensors can be configured to acquire, collect, and/or sense the real-world driving data.

In some arrangements, the external data source(s) 150 can be substantially stationary structures. In some arrangements, the external data source(s) 150 can be dynamic structures. In one or more arrangements, the external data source(s) 150 can include one or more vehicles and/or one or more infrastructure devices.

"Vehicle" means any form of motorized transport, now known or later developed. Non-limiting examples of the vehicle(s) include automobiles, motorcycles, aerocars, drones, aircraft, or any other form of motorized transport. The vehicle(s) may be operated manually by a human driver, semi-autonomously by a mix of manual inputs from a human driver and autonomous inputs by one or more vehicle computers, fully autonomously by one or more vehicle computers, or any combination thereof. "Infrastructure device" means any device positioned along or near a road and to which sensors are attached to or integrated into. In some arrangements, the infrastructure device(s) can be stationary. Examples of infrastructure devices can include streetlights, traffic lights, traffic signs, road signed, billboards, bridges, buildings, poles, etc. In some instances, the infrastructure device may be a road itself when sensors are embedded therein.

In some arrangements, the external data source(s) 150 can include any devices, components and/or systems that store real-world driving data. For instance, the real-world driving data can be stored in the data store(s) or in any other suitable type of data storage. In some arrangements, the external data source(s) 150 can be located onboard a vehicle. In some arrangements, the external data source(s) 150 can be located on a remote server.

Figure 2:
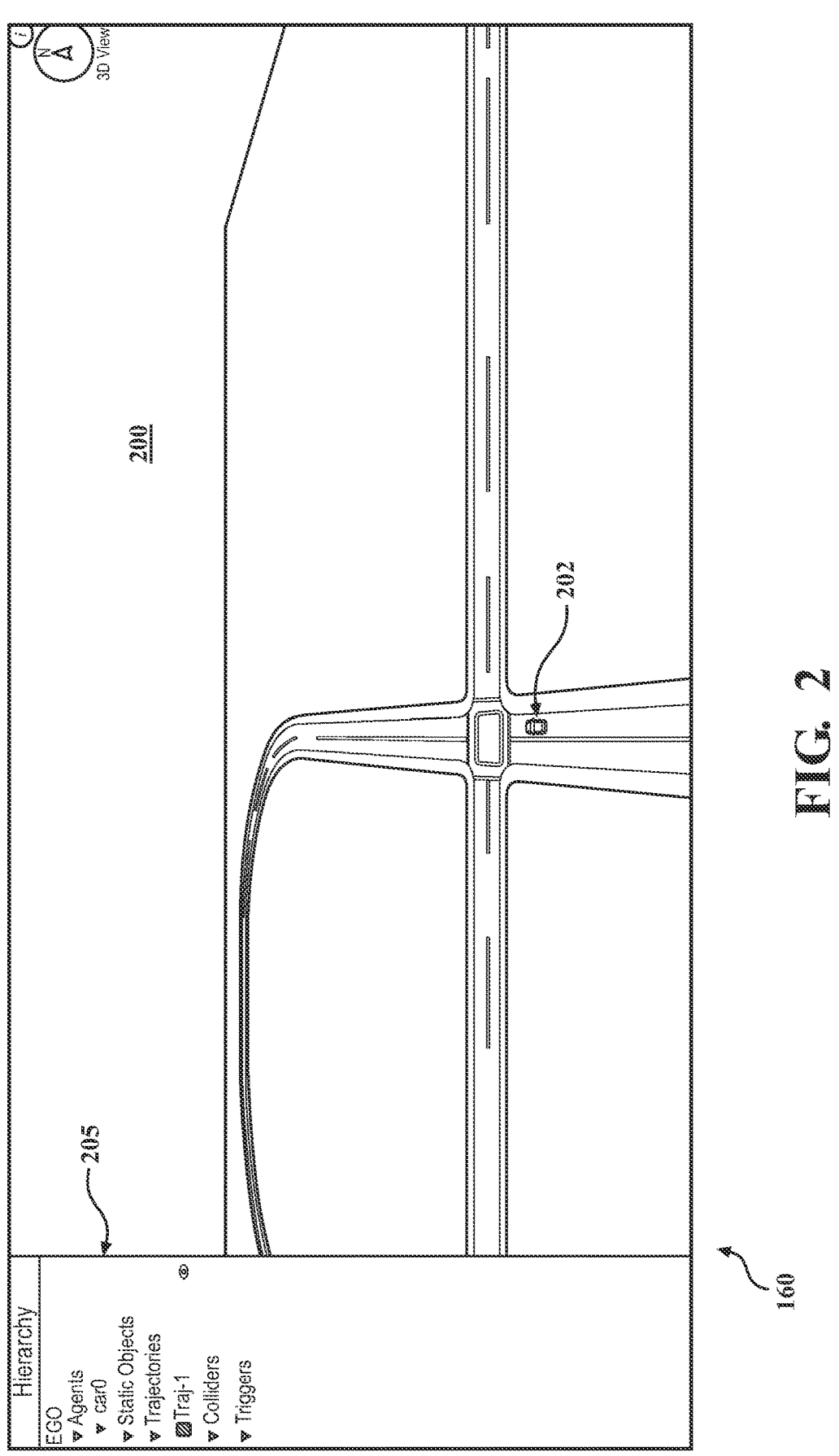
FIG. 2 is an example of a local scenario file presented in an editor, showing an example of a starting point for a selected environment.
Figure 3:
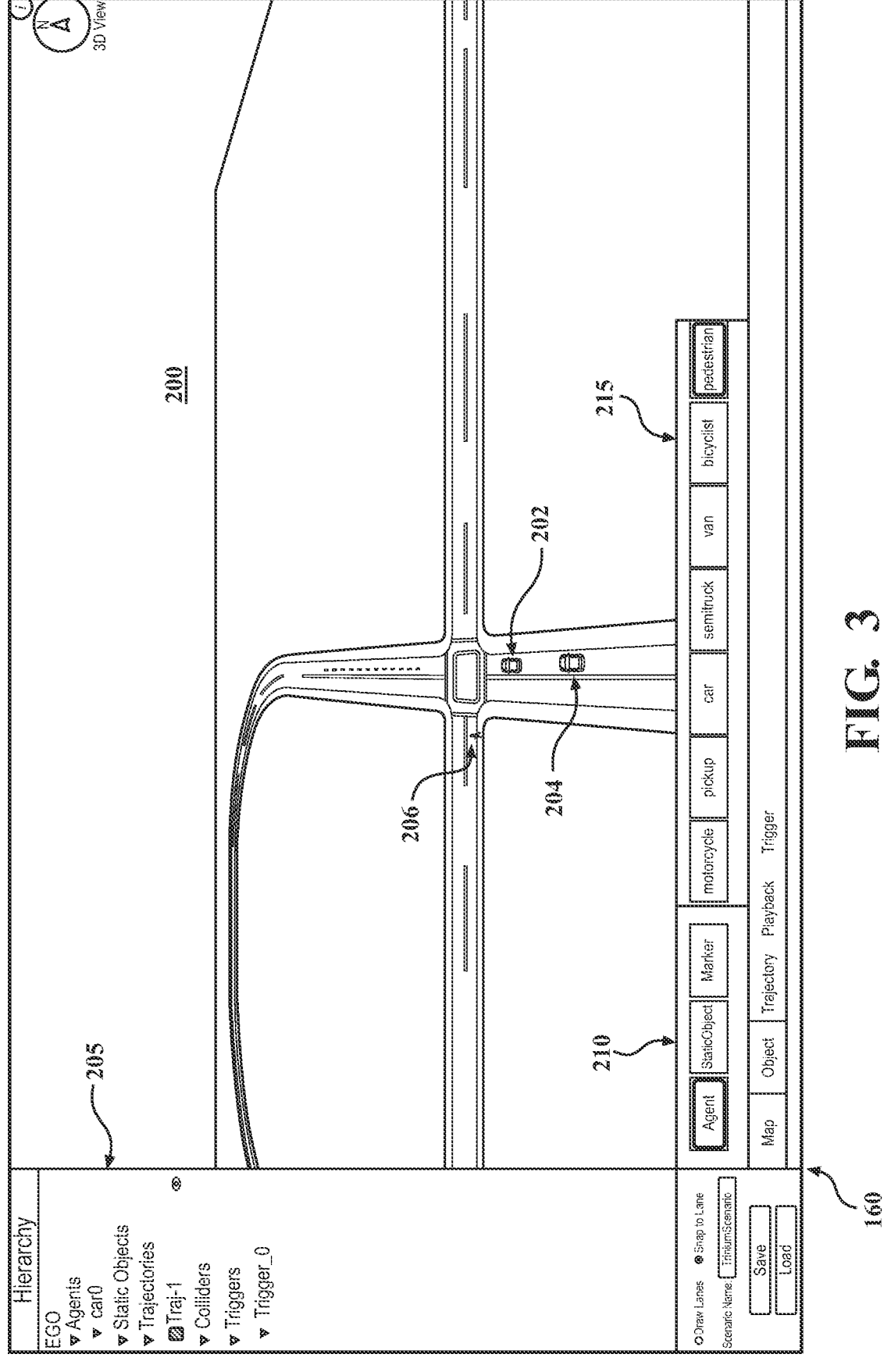
FIG. 3 is an example of the local scenario file presented in the editor, showing an example of one or more objects placed in the selected environment.
Figure 4:
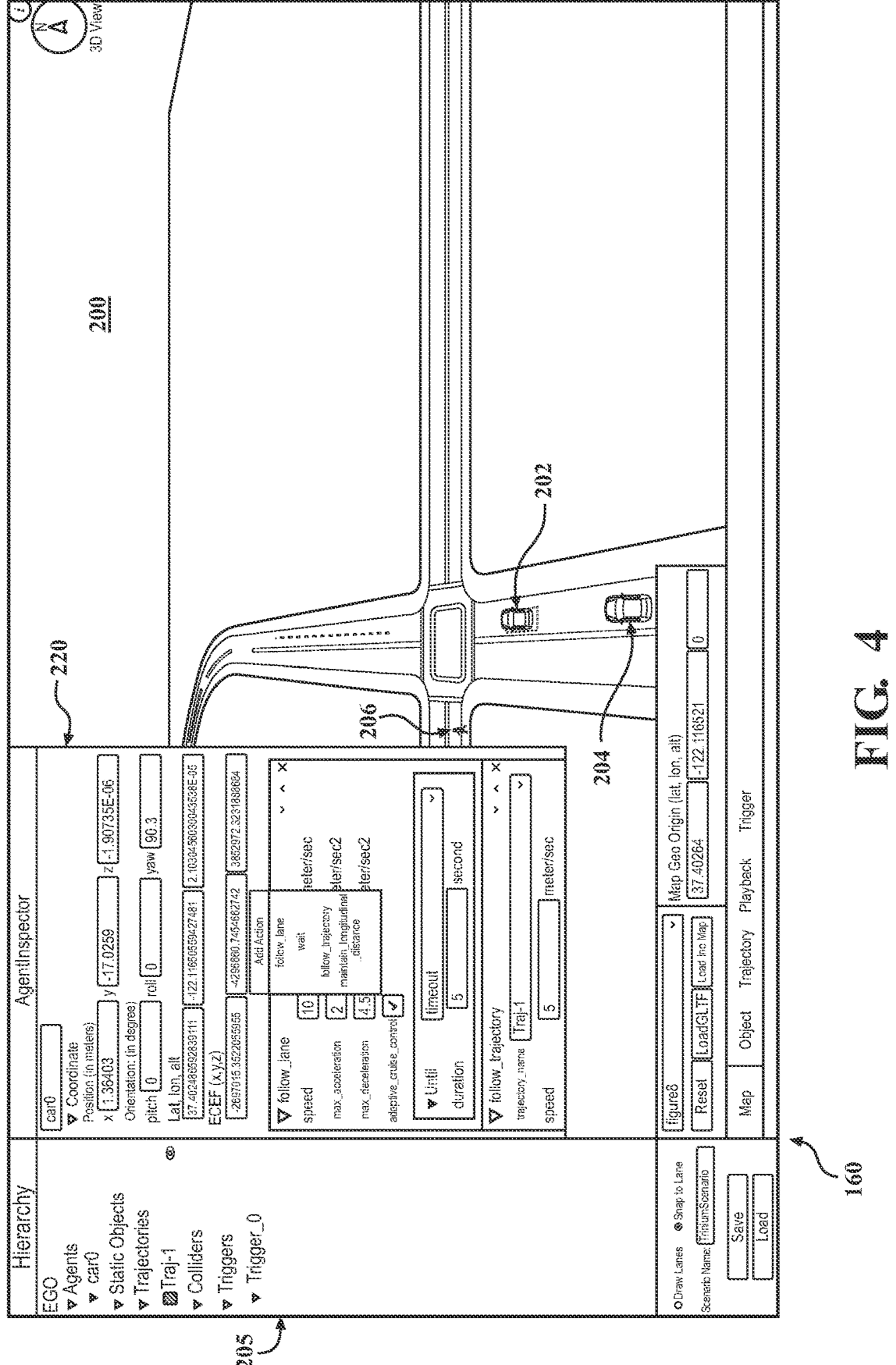
FIG. 4 is an example of the local scenario file presented in the editor, showing an example of a user interface to allow a user to assign parameters to a selected object.

Referring to FIGS. 2-4, an example of a scenario file 160 as presented by the editor(s) 130 is shown. FIG. 2 presents a driving scenario 200. Prior to being presented the driving scenario 200, the user may select a desired driving environment. In this instance, the user has selected an intersection. There can be any of a number of pre-defined driving scenarios to select from. In some arrangements, the user can build the driving scenario from scratch without any pre-defined stating point.

In some arrangements, the driving scenario 200 can be pre-populated with one or more objects. For example, in this example, the driving scenario 200 can be pre-populated with a vehicle 202, which can be considered to be an ego vehicle. The editor(s) 130 can present a user interface (e.g., a menu 205) with several parameters for the user to select from. As can be seen in the example shown in FIG. 2, non-limiting examples of some of the parameters provided in the menu 205 includes agents, static objects, trajectories, colliders, and triggers. These parameters can be assigned to one or more objects in the driving scenario 200.

Referring to FIG. 3, the user can populate the driving scenario 200 with one or more objects. In this example, the user has placed another vehicle 204 and a pedestrian 206 in the driving scenario 200. The editor 130 can be configured to allow the user to place the objects in a desired location in the driving scenario 200, such as by dragging and dropping or in some other manner. It will be appreciated that the other vehicles and pedestrians are merely two examples of types of objects that can be placed in the driving scenario 200. The objects can be stationary objects or dynamic objects. The objects can be living or non-living.

In some arrangements, the objects can be selected from a user interface (e.g., a menu 210) provided by the editor(s) 130. In this example, the menu 210 can allow a user to place an agent, a static object, and/or a marker in the driving scenario 200. Here, the agent has been selected, which brings up another menu 215. The menu 215 allow a user to select the type of agent desired. Non-limiting examples of the agent include motorcycles, pickups, cars, semitrucks, vanes, bicycles, and/or pedestrians.

Referring to FIG. 4, a user can assign one or more attributes, characteristics, parameters, or other data with any of the objects or agents in the driving scenario 200. Examples of attributes can include position, orientation, actions, trajectories, speed, acceleration, triggers (e.g., if X happens, then Y), etc. The user can do so by selecting one of the objects, which can cause a window to be presented to the user. The window can include one or more attributes that can be assigned to the objects. The attributes can be predefined. The user can assign or adjust the settings of the attributes within predefined ranges, values, strings, or other suitable inputs. This assignment of attributes can be done for each object individually. In some arrangements, the attributes can be assigned based on type of object. Thus, all objects of a certain type can have the same attributes. In some arrangements, the attributes can be assigned to other objects int the environment, such as the road itself. In some arrangements, the attributes can be assigned geographically. Thus, objects within a selected area can be assigned certain attributes.

In this particular, example, the vehicle 202 has been selected. As can be seen, a user interface (e.g., menu 220) is shown allowing a user to assign one or more parameters (e.g., attributes, characteristics, behaviors, or other data) to the vehicle 202.

However, a user may want to modify an existing parameter (e.g., amend the available ranges of suitable inputs for a parameter and/or delete a parameter) and/or if a user wants to add a new parameter, then arrangements described herein can facilitate such activity. If a user wishes to do so, the schema-UI module(s) 140 can generate a user interface based on a schema. The schema-UI module(s) 140 can cause the user interface to be presented. The user can provide an input on the user interface, modifying an existing parameter and/or adding a new parameter. The input can be in the form of a schema, which the user will know how to use and write. The system 100 can create user interfaces based on the schema to allow the user to interact with the scenario file 160 and/or driving logs 155 in a straightforward manner.

Referring to FIG. 5, an example of a user interface 500 based on a schema is shown. The user interface 500 can allow a user to define a new parameter, modify an existing parameter, or delete an existing parameter. It will be appreciated that the user interface 500 shown in FIG. 5 is merely one example and that arrangements described herein are not limited to the particular schema shown.

In this example, the user interface 500 includes the lat/long position and agent information. The lat/long position can be in the form of a decimal number. The agent information can include the type (car, motorcycle, etc.), starting pose information, and behaviors. Using the user interface 500, a user can be allowed to quickly modify the scenario. For example, the user interface 500 can include elements that allow for the adjustment of the lat/long position and agent information. The user interface 500 can allow the user to quickly adjust the lat/long position of the agent as well as modify the agent information, such as allowing user to quickly change the agent type, starting pose, and behaviors. The user interface 500 can also be used to defined entirely new agents, objects, behaviors, trajectories, triggers, constraints, or any other aspect.

After a modified or new schema 170 is defined using the schema, the modified or new parameter defined by the schema will be available as an option in the editor(s) 130. For example, the modified or new parameter would appear in one or more of the user interfaces (e.g., the menus 205, 210, 220) shown in FIGS. 2-4. Also, the modified or new schema 170 can be sent to the simulator(s) 110. Thus, when a user selects an object in the scenario, a menu will appear, such as the menu 220 shown in FIG. 4. One or more of the menus 205, 210, 220 can be automatically updated to include the modified parameter or new parameter. Likewise, after the schema for an existing parameter is updated, such as by changing the range and/or type of suitable inputs, one or more of the menus 205, 210, 220 can be automatically updated to reflect the new range of suitable values.

It should be noted that the definitions in the schema can allow for inputs in any suitable form. For instance, the schema can allow inputs that are numerical values or ranges, or the schema can allow for more complex inputs. For instance, the schema can allow for inputs such as positions relative to other objects or agents in the scene, time of day, etc.

The schema-UI module(s) 140 can allow a researcher or other developer of agent behavior to create a front end that encapsulates all that is needed to configure their agents. The schema-UI module(s) 140 and/or the system 100 can enable a user to create scenarios by providing a visual framework to develop tools directly from the schema. The tools can be automatically generated from the schema. Doing so can allow the user to test within the editor(s) 130 and iterate quickly.

In some arrangements, the editor(s) 130 can be configured to enable playback of the scenario file 160 or a recreation of real-world driving data. The playback can include any new or updated parameters defined by the user (e.g., the researcher).

When the updates are made, the user can run the simulation. The editor(s) 130 can connect to simulator(s) 110 and show what happens as part of simulation in the window of the editor 130 itself. The simulator(s) can run the scenario file as long as the simulator(s) 110 are configured to read the new and/or modified schema. If the simulator(s) have the same version of the schema, then the simulator(s) 110 can run the new and/or modified schema. However, if the simulator(s) 110 have a prior version of the schema, then the new and/or modified schema will not load or execute. The simulator(s) 110 can be configured to edit out at least the portion of the new and/or modified schema that it cannot read. Alternatively or additionally, the simulator(s) 110 can indicate to the user that it does not know how to handle the new and/or modified schema. Alternatively or additionally, the user can create an algorithm to enable the simulator(s) 110 to process the new schema and/or the modified schema. If the new schema and/or the modified schema tests favorably, the new schema and/or the modified schema can be uploaded for incorporation into the simulator(s) 110 and/or the editor(s) 130. When a subsequent version of the simulator(s) 110 and/or the editor(s) 130 is issued, the parameter(s) defined by new schema and/or the modified schema can be incorporated for user by all users.

While the above discussion has been directed to a driving scenario simulation, it will be appreciated that arrangements described herein can be applied in other contexts. For instance, arrangements described herein can be used to create evaluation tools. FIG. 6 is an example of a user interface 600 based on a schema for defining a new evaluation tool. The evaluation tools can be utilized to evaluate a simulation and/or real-world driving data to assess how a vehicle (e.g., an autonomous vehicle) performed. In this example, the schema includes a check of the speed of the vehicle, and a check of the distance to objects.

Based on the schema provided in the user interface 600, the system 100 can generate another user interface that allows a user to easily change the speed check and the distance check. In this example, the schema can also limit the maximum speed and maximum distance to being greater than or equal to zero. As such, the user interface will only allow the user to put in valid inputs that satisfy these criteria. In addition to the driving scenario example, the evaluation tool can be applied to real-world driving data. For instance, the evaluation tool can be used in connection with one or more driving logs 155 or other real-world driving data. In some arrangements, the driving logs 155 can be visualized using the simulator(s) 110 and/or the editor(s) 130, such as a playback of the driving scenario reflected by the real-world driving data. In such case, the evaluation tools can be developed in the context of the simulator(s) 110 and/or editor(s) 130. In other arrangements, the evaluation tools can be run on the driving logs entirely separate from the simulator(s) 110. In some instance, if a novel or unusual situation is captured in the real-world driving data, the evaluation tools can be designed around the situation in the real-world driving data.

Returning to FIG. 1, it should be noted that the system 100 can include several elements that are not shown. For instance, the system 100 can include one or more processors. "Processor" means any component or group of components that are configured to execute any of the processes described herein or any form of instructions to carry out such processes or cause such processes to be performed. The processor(s) may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) can include at least one hardware circuit (e.g., an integrated circuit) configured to carry out instructions contained in program code. In arrangements in which there is a plurality of processors, such processors can work independently from each other, or one or more processors can work in combination with each other. The simulator(s) 110 and/or the editor(s) 130 can be run on and/or can include the processor(s).

The system 100 can include one or more data stores for storing one or more types of data. The data store(s) can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) can be a component of the processor(s), or the data store(s) can be operatively connected to the processor(s) for use thereby. The term "operatively connected," as used throughout this description, can include direct or indirect connections, including connections without direct physical contact. The simulator(s) 110 and/or the editor(s) 130 can include and/or can access the data store(s).

The system 100 can include one or more input interfaces. An "input interface" includes any device, component, system, element or arrangement or groups thereof that enable information/data to be entered into a machine. The input interface(s) can receive an input from a vehicle occupant (e.g., a driver or a passenger). Any suitable input interface(s) can be used, including, for example, a keypad, display, touch screen, multi-touch screen, button, joystick, mouse, trackball, microphone and/or combinations thereof. The user can use one or more of the input interfaces to define or modify schema and/or to interact with scenario files 160 and/or external data sources 150.

The system 100 can include one or more output interfaces. An "output interface" includes any device, component, system, element or arrangement or groups thereof that enable information/data to be presented to a person. The output interface(s) can present information/data to a user. The output interface(s) can include a display, an earphone, and/or speaker. Some components of the system 100 may serve as both a component of the input interface(s) and a component of the output interface(s).

When a simulation is finalized, it can be used by operations personnel. The users can download the simulation and run it locally, or the users can access the simulation remotely, such as through a website. Operations personnel typically do not have the ability to define new objects, behaviors, tools, etc. The operations personnel can usually generate scenarios based on the parameters that are already available.

Now that the various potential systems, devices, elements and/or components of the system of training a model to detect driver interactions have been described, an example of an associated method will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 7:
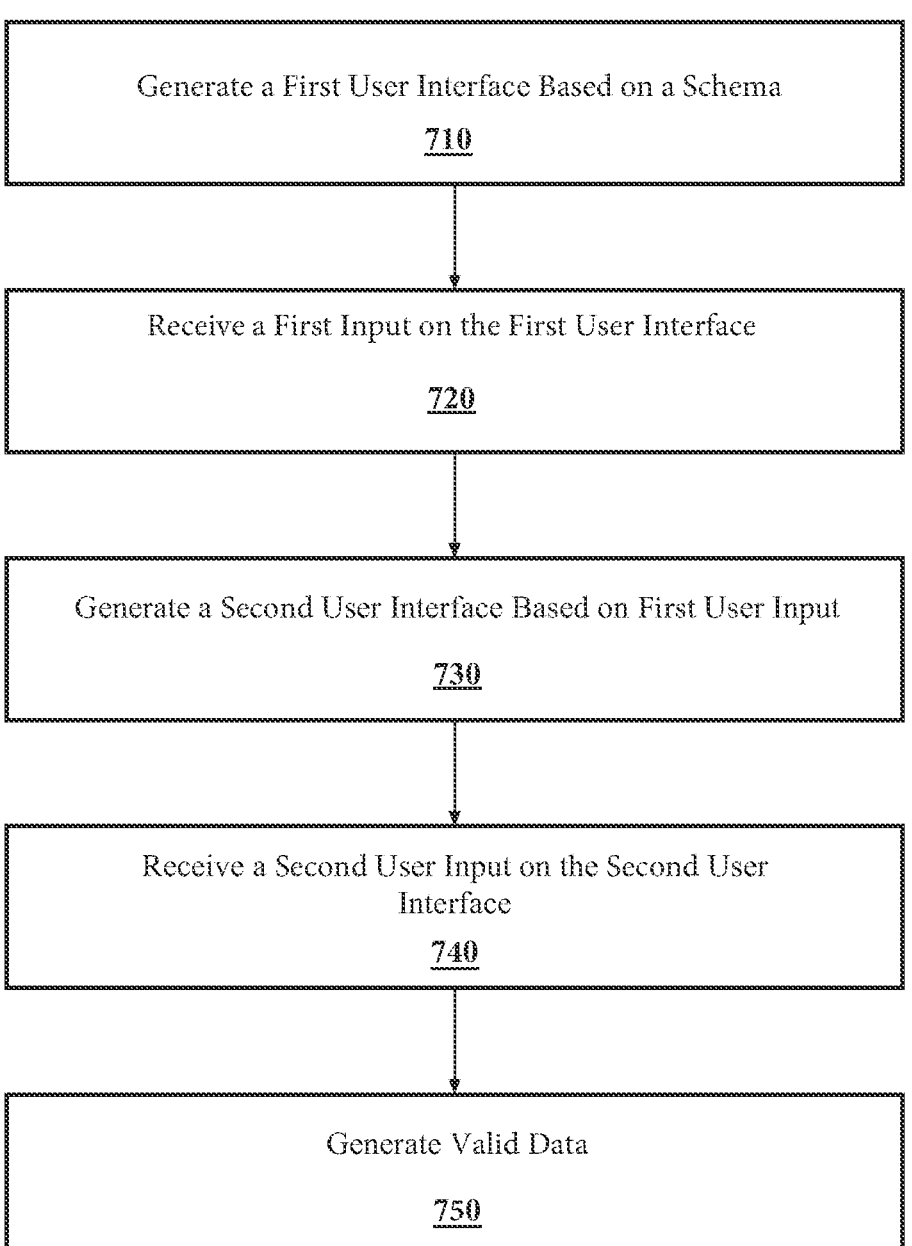
FIG. 7 is an example of a method.

Turning to FIG. 7, an example of a method 700 is shown. At block 710, a first user interface can be generated. The first user interface can be based on a schema. Examples of the first user interface are shown in FIGS. 5 and 6. The schema can allow the user to define one or more new parameters and/or modify one or more existing parameters. The first user interface can be generated by the schema-UI module(s) 140 and/or the processor(s). The first user interface can be presented on a display, one of the output interface(s), and/or within the editor(s) 130. The method 700 can continue to block 720.

At block 720 a first input can be provided on the first user interface. The first input can be a new parameter defined by a schema and/or a modification to an existing parameter defined by a schema. The parameter(s) can be in the nature of an aspect of a scenario file and/or an evaluation tool for use in connection with a simulation and/or real-world data. Acceptable inputs for the parameter(s) can be defined in the schema. Modifying an existing parameter can include modifying the range of acceptable inputs for the parameter(s). The first input can be provided by the user via one of the input interface(s). The method 700 can continue to block 730.

At block 730, a second user interface can be generated based on the first input. The second user interface can include the new parameter and/or the modification to the existing parameter provided in the first input. For example, the second user interface can be one of the menus 205, 210, 220 presented by the editor(s) 130 in FIGS. 2-4. As an example, the new parameter can be a new agent behavior. In such case, the menu 220 can be updated to reflect the new agent behavior. Thus, the second user interface can allow the user to associate the new behavior with one or more objects in a driving scene and/or enter suitable values for the behavior. The second user interface can be generated by the schema-UI module(s) 140 and/or the processor(s). The second user interface can be presented on a display, one of the output interface(s), and/or within the editor(s) 130. The method 700 can continue to block 740.

At block 740 a second input can be provided on the second user interface. In some instances, the second input can relate to the new parameter and/or the modification to the existing parameter. It should be noted that the new parameter and/or the modified existing parameter are available for use by the user in the second user interface. However, the user may or may not actually use the new parameter and/or the modified existing parameter in some instances. Thus, in some cases, the second input may not relate to the new parameter and/or the modification to the existing parameter. The second input is consistent with the suitable inputs defined by the underlying schema. The second input can be provided by the user via one of the input interface(s). The method 700 can continue to block 750.

At block 750, valid data can be generated. The valid data can be in the form of a file that includes only data that conform with the schemas. The valid data can be generated by the editor(s) 130 and/or the processor(s).

The valid data can be used for various purposes. For instance, the valid data can be used in connection with the simulator(s) 110 to run a driving scenario simulation. The simulation can be used to test the new parameter to ensure that it is behaving in the correct way. As another example, the valid data can be used in connection with driving logs 155 for validation and/or for other purposes. The valid data can define a tool for evaluating real-world driving data.

The method 700 can end. Alternatively, the method 700 can return to block 710 or to some other block. For instance, the method can include uploading the new schema or evaluation tool to simulator(s) 110. The method can include running a simulation, using the simulator(s) 110, with the new schema. The method can include developing an ADAS design using the results of a simulation and/or an evaluation tool. The method 700 can be repeated at any suitable point, such as at a suitable time or upon the occurrence of any suitable event or condition, such as a user request within the editor(s) 130.

It will be appreciated that arrangements described herein can provide numerous benefits, including one or more of the benefits mentioned herein. For example, arrangements described herein can generate a user interface based on the schema to allow users to quickly modify tools for autonomous driving applications. Arrangements described herein can use schema to drive the development of a tool that always generates valid data. Arrangements described herein can create a tool that is designed to output data that agrees with the schema. Arrangements described herein can provide a user interface based on a schema to allow for the rapid generation/modification of tooling for autonomous driving applications. Arrangements described herein can avoid tedious aspects when developing and/or modifying tooling for autonomous driving applications. Arrangements described herein can avoid the need for complex code to be written. Arrangements described herein can generate a user interface based on a schema to allow a user to quickly modify tools for autonomous driving applications. Arrangements described herein can create an entire visual framework in which tools can be generated directly from schema. Arrangements described herein provide a means to create scenarios and/or evaluate vehicle performance.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/ units or less, within 14 degrees/percent/units or less, within 13 degrees/percent/units or less, within 12 degrees/percent/ units or less, within 11 degrees/percent/units or less, within 10 degrees/percent/units or less, within 9 degrees/percent/ units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the hereof.

What is claimed is:

1. A system comprising:
one or more processors programmed to initiate executable operations comprising:
generating a first user interface based on a schema;
receiving, on the first user interface, a first input being a new parameter defined by a schema and including a range and/or a type of valid inputs for the new parameter, the new parameter not previously included in the first user interface and being a new agent, a new object, a new behavior, a new trajectory, a new trigger, or a new constraint in a simulated driving scenario;
generating, using the first input, a second user interface including the new parameter and a menu reflecting the range and/or the type of valid inputs for the new parameter, the new parameter not previously included in and not previously being definable by the second user interface;

receiving, on the second user interface, a second input relating to the new parameter; and
generating, based on the second input, valid data conforming with the schema defined in the first input, whereby a user can preview the new parameter without having to wait for the new parameter to be incorporated into an editor or simulator.

2. The system of claim 1, wherein the one or more processors are a part of an editor for a simulation or real-world driving data.

3. The system of claim 1, wherein the schema is part of a local scenario file.

4. The system of claim 1, further including:
causing a playback of the simulated driving scenario with the new parameter defined by the schema.

5. The system of claim 1, further including:
causing the new parameter defined by the schema to be uploaded to a simulator, whereby the new parameter defined by the schema can be incorporated into a simulation.

6. The system of claim 1, further including:
causing a simulation to run on the simulated driving scenario with the new parameter defined by the schema.

7. The system of claim 1, wherein the valid inputs include a position relative to other objects or agents in the simulated driving scenario.

8. The system of claim 1, wherein the valid inputs include time of day.

9. A system comprising:
one or more processors programmed to initiate executable operations comprising:
generating a first user interface based on a schema;
receiving, on the first user interface, a first input being a new parameter defined by a schema and including a range and/or a type of valid inputs for the new parameter, the new parameter not previously included in the first user interface and being an evaluation tool for a simulation of a driving scenario or for real-world driving data;
generating, using the first input, a second user interface including the new parameter and a menu reflecting the range and/or the type of valid inputs for the new parameter, the new parameter not previously included in and not previously definable by the second user interface;
receiving, on the second user interface, a second input relating to the new parameter; and
generating, based on the second input, valid data conforming with the schema defined in the first input, whereby a user can preview the new parameter without having to wait for the new parameter to be incorporated into an editor or simulator.

10. The system of claim 9, wherein the evaluation tool is used on real-world driving data from an external source.

11. The system of claim 10, wherein the real-world driving data is a driving log.

12. The system of claim 9, wherein the evaluation tool is used in connection with a simulation of a driving scenario.

13. The system of claim 9, wherein the new parameter includes at least one of a check of a speed of a vehicle and a check of a distance to objects.

14. A method comprising:
generating a first user interface based on a schema;
receiving, on the first user interface, a first input including a new parameter defined by a schema and a range and/or a type of valid inputs for the new parameter, the new parameter not previously included in the first user interface and being a new agent, a new object, a new behavior, a new trajectory, a new trigger, or a new constraint in a simulated driving scenario;

generating, using the first input, a second user interface including the new parameter and a menu reflecting the range and/or the type of valid inputs for the new parameter, the new parameter not previously included in and not previously definable by the second user interface;

receiving, on the second user interface, a second input relating to the new parameter; and generating, based on the second input, valid data conforming with the schema defined in the first input, whereby a user can preview the new parameter without having to wait for the new parameter to be incorporated into an editor or simulator.

15. The method of claim 14, further including:

causing a playback of the simulated driving scenario with the new parameter defined by the schema.

16. The method of claim 14, further including:

causing the new parameter defined by the schema to be uploaded to a simulator, whereby the new parameter defined by the schema can be incorporated into a simulation.

17. The method of claim 14, further including:

causing a simulation to run on the simulated driving scenario with the new parameter defined by the schema.

18. The method of claim 14, wherein the new parameter is not recognized by a simulator, and wherein the method further includes:

receiving a user-created algorithm to enable the new parameter to be processed by the simulator.

19. The method of claim 14, further including:

causing the new parameter to be uploaded for incorporation into a simulator and/or an editor; and receiving or accessing a subsequent version of the simulator and/or the editor, wherein the new parameter is incorporated into the subsequent version of the simulator and/or the editor, whereby the new parameter is available for use by all users.

20. A method comprising:

generating a first user interface based on a schema;

receiving, on the first user interface, a first input including a new parameter defined by a schema and a range and/or a type of valid inputs for the new parameter, the new parameter not previously included in the first user interface and being an evaluation tool for a simulation of a driving scenario or for real-world driving data;

generating, using the first input, a second user interface including the new parameter and a menu reflecting the range and/or the type of valid inputs for the new parameter, the new parameter not previously included in and not previously definable by the second user interface;

receiving, on the second user interface, a second input relating to the new parameter; and generating, based on the second input, valid data conforming with the schema defined in the first input, whereby a user can preview the new parameter without having to wait for the new parameter to be incorporated into an editor or simulator.

21. The method of claim 20, wherein the evaluation tool is used in a simulation of a driving scenario.

22. The method of claim 20, wherein the evaluation tool is used on real-world driving data from an external source.

* * * * *